United States Patent
Han et al.

(10) Patent No.: US 11,075,848 B2
(45) Date of Patent: Jul. 27, 2021

(54) FAST PATH FOR ACKNOWLEDGEMENT FRAMES IN WIRELESS NETWORKS

(71) Applicant: Hewlett Packard Enterprise Development LP, Houston, TX (US)

(72) Inventors: Jianpo Han, Beijing (CN); Qiang Zhou, Beijing (CN); Andre Beaudin, St Laurent (CA); Guangzhi Ran, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/546,516

(22) Filed: Aug. 21, 2019

(65) Prior Publication Data

US 2021/0058333 A1     Feb. 25, 2021

(51) Int. Cl.

| H04L 12/863 | (2013.01) |
|---|---|
| H04L 12/801 | (2013.01) |
| H04W 40/12 | (2009.01) |
| H04L 29/08 | (2006.01) |
| H04W 84/12 | (2009.01) |

(52) U.S. Cl.
CPC ............ *H04L 47/624* (2013.01); *H04L 47/34* (2013.01); *H04L 67/12* (2013.01); *H04W 40/12* (2013.01); *H04W 84/12* (2013.01)

(58) Field of Classification Search
CPC ....... H04L 47/34; H04L 67/12; H04L 47/624; H04W 40/12; H04W 84/12
See application file for complete search history.

(56) References Cited

U.S. PATENT DOCUMENTS

| 7,177,941 B2 | 2/2007 | Biran et al. |
|---|---|---|
| 7,385,923 B2 | 6/2008 | Baratakke et al. |
| 7,694,024 B2 | 4/2010 | Philbrick et al. |
| 7,957,379 B2 | 6/2011 | Minami et al. |
| 9,438,699 B1 | 9/2016 | Shetty et al. |

(Continued)

OTHER PUBLICATIONS

Fund, F., TCP Congestion Control in Lossy Wireless Networks, (Research Paper), Feb. 12, 2016, 16 Pgs.

*Primary Examiner* — Syed Ali
(74) *Attorney, Agent, or Firm* — Jaffery Watson Mendonsa & Hamilton (57) ABSTRACT

Embodiments are directed to a fast path for acknowledgement frames in wireless networks. An embodiment of a storage medium includes instructions for operations including receiving frames at a network device via a wireless communication channel, each frame including a sequence number; holding the received frames in a reorder buffer to be reordered according to the sequence numbers of the received frames, wherein a frame is to be removed from the reorder buffer for delivery to a next process upon the sequence number of the frame equaling an expected next sequence number or upon expiration of a reordering timeout period for the frame; and, upon receiving an acknowledgment (ACK) frame, the ACK frame containing no data and having a sequence number that is later than any ACK frame that has been previously processed at the network device bypassing the reorder buffer for the ACK frame, and delivering the ACK frame to the next process, and maintaining an order position for the ACK frame in the reorder buffer until the reordering timeout period expires for the ACK frame.

10 Claims, 6 Drawing Sheets

(56) References Cited

U.S. PATENT DOCUMENTS

| | | | | |
|---|---|---|---|---|
| 10,505,849 B1* | 12/2019 | Iny | ......................... | H04L 47/283 |
| 2004/0100963 A1* | 5/2004 | Guo | ...................... | H04W 28/10 |
| | | | | 370/394 |
| 2007/0121506 A1* | 5/2007 | Wydrowski | ............ | H04L 47/624 |
| | | | | 370/231 |
| 2008/0103610 A1* | 5/2008 | Ebrom | .................... | H04L 67/12 |
| | | | | 700/29 |
| 2008/0188963 A1* | 8/2008 | McCoy | ............... | H04L 12/2818 |
| | | | | 700/90 |
| 2010/0061272 A1* | 3/2010 | Veillette | .................. | H04L 45/48 |
| | | | | 370/254 |
| 2015/0146648 A1* | 5/2015 | Viger | .................... | H04L 1/1685 |
| | | | | 370/329 |
| 2016/0095139 A1* | 3/2016 | Ding | .................... | H04W 28/26 |
| | | | | 370/329 |
| 2016/0371961 A1* | 12/2016 | Narang | ................... | G08B 29/18 |
| 2018/0054794 A1* | 2/2018 | Cariou | .................. | H04W 64/00 |
| 2019/0097952 A1* | 3/2019 | Yong | ...................... | H04W 28/18 |
| 2019/0349426 A1* | 11/2019 | Smith | ..................... | H04L 45/20 |
| 2020/0107222 A1* | 4/2020 | Lou | .......................... | H04L 47/32 |

* cited by examiner

FAST PATH FOR ACKNOWLEDGEMENT FRAMES IN WIRELESS NETWORKS

BACKGROUND

Frame delays and drops are common in the operation of lossy wireless networks. The frame delays and drops may occur as a result of transmission errors, signal interference, network congestion, or other causes. Wireless transmissions may include TCP (Transmission Control Protocol) operations, and TCP communications are sensitive to packet drop and buffering.

To address issues regarding frames that are lost or delayed in transmission, IEEE 802.11n operation provides for the buffering and reordering of frames that are received out of order.

However, this may result in a TCP acknowledgement (ACK) frame being held in the receiver reorder window. In a noisy environment, the ACK frame may be held because one or more earlier frames in the queue, such as an earlier ACK frame and/or data frame, have been dropped or delayed. As a result the ACK may not be delivered until a reordering time out is reached, and causing delay in processing and reduced overall system performance.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to a fast path for acknowledgement frames in wireless networks.

In some embodiments, an apparatus, system, or process provides a fast path is for an ACK (acknowledgement) frame received in a wireless network, such as a packet received at an access point (AP) or other network device. The fast path is provided to reduce or eliminate delay for an ACK packet caused by buffering and reordering of received packets, and thus improve overall performance in network operation.

Rx (receiver) reordering was introduced in IEEE (Institute of Electrical and Electronic Engineers) 802.11n for AMPDU (Aggregated MAC (Media Access Control) Protocol Data Aggregation) frame aggregation, which includes application of Block ACK frames to aggregate multiple acknowledgements into a single frame. (IEEE 802.11-2016, 10.24.4 section). Because TCP (Transmission Control Protocol) frames, including ACK frames, may arrive at the Rx side out of order, the receiver is required to buffer and reorder the frames to enable processing of the frames in order.

However, from a TCP perspective, there is no need to buffer an ACK frame because traffic from several sessions may be mixed in the same queue, and, if a previous TCP is dropped, there is no need to buffer the next TCP ACK for reordering In some embodiments, an apparatus, system, or process is to bypass a reorder window (which may also be referred to herein as a reorder buffer) for a TCP ACK frame that does not carry TCP data. The apparatus, system, or process is further to maintain ordering of the reorder buffer being maintained. An operation to maintain the ordering of the reorder buffer may include, but is not limited to, placing a placeholder frame in the reorder window to substitute for the ACK frame. Further, to fulfill a requirement that the TCP ACK frames be delivered in order, older or obsolete ACKS are to be dropped.

In this manner, a system is capable of quicker processing of ACK frames that do not need to be held in the reorder buffer, while maintaining the normal required operation of the reorder buffer and the required sequencing of ACK packets. The process in addressing the ACK packets is transparent to the other side, and thus no change in operation by a transmitting device is required.

As used herein, access point (AP) (also referred to as a wireless access point (WAP)) refers to a Wi-Fi networking hardware device that allows Wi-Fi devices to connect to a wired network, including connection to the Internet or an intranet. The AP may connect to a router (via a wired network) as a standalone device, or may be an integral component of the router itself.

As used herein, network device refers to a device or system operating in a wireless network, and may include, but is not limited to, a wireless access point, a laptop or other computing device, a cell phone, or an IoT (Internet of Things) device.

Figure 1:
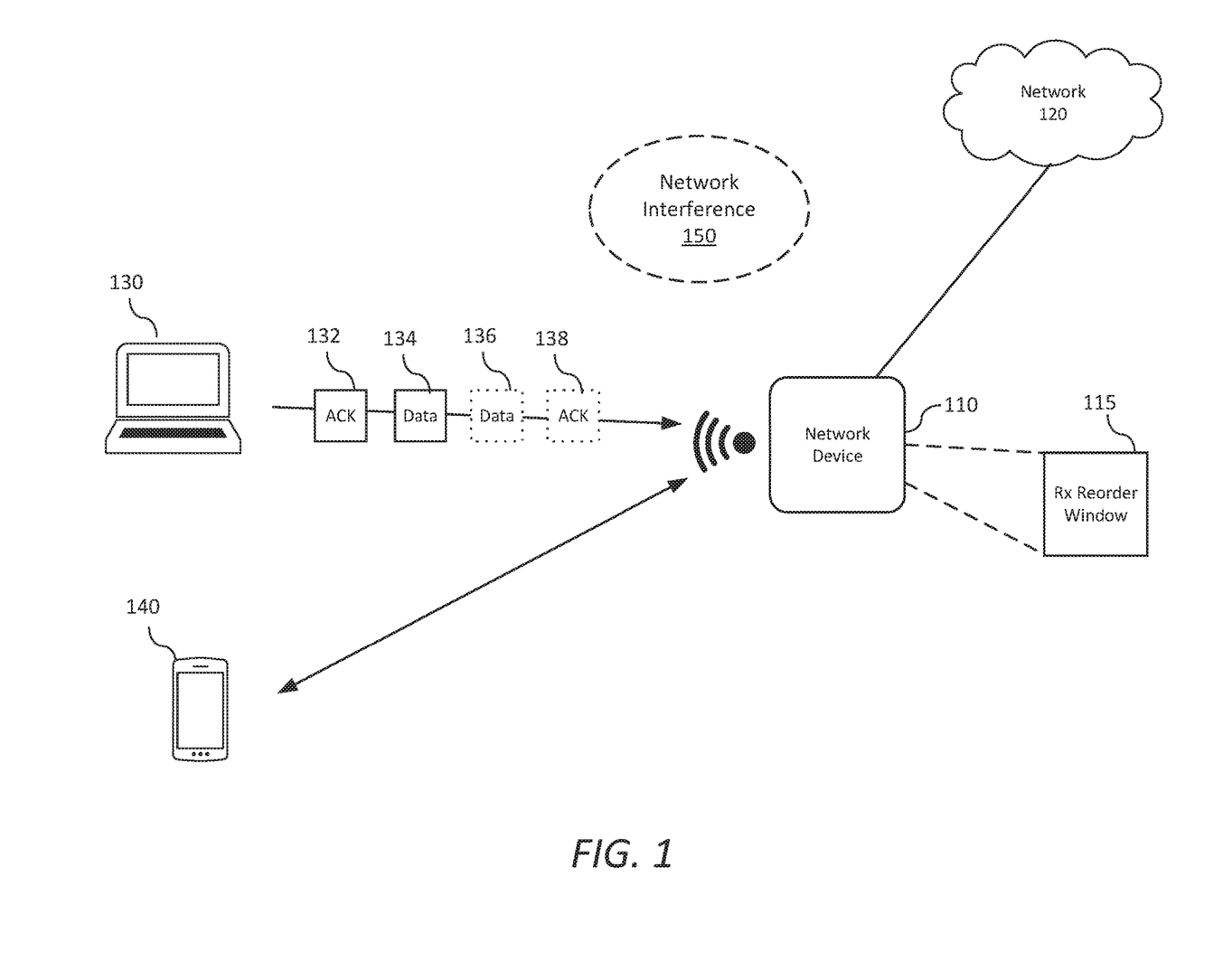
FIG. 1 is an illustration of frame handling in a lossy wireless environment according to some embodiments.

FIG. 1 is an illustration of frame handling in a lossy wireless environment according to some embodiments. In some embodiments, a network device 110, which may include or be linked with an access point, is to support wireless communication including transfer of TCP frames with one or more connected devices, such as the illustrated laptop 130 and cellular telephone 140. The network device 110 includes an interface to a network 120, which may include connection to the Internet. The network device 110 may include support for an Rx reorder window 115 under one or more IEEE 802.11 protocol standards, the network device 110 to buffer and reorder received frames as needed utilizing the Rx reorder window 115. The network environment may be a noisy and lossy environment, including, for example, network interference 150 from one or more competing radio sources.

In some embodiments, the network device is to receive and process TCP frames from a connected device via wireless communication channel, which may include the illustrated frames transmitted from a computing device such as laptop 130. The frames may include multiple data frames 134 and 136 and one or more ACK frames 132 and 138, wherein one or more frames, such as data frame 136 and/or ACK frame 138 in the illustrated example, have been lost in transmission and are not received, or are received out of order, at the network device 110.

In some embodiments, the network device 110 is to receive the transmitted frames, and, upon determining that frame 132 is an ACK frame that does not contain data, is to bypass the reorder window for the ACK frame 132, the ACK frame being directed to further processing without buffering such frame for reordering. In some embodiments, the network device is further to maintain the ordering of the frames received and buffered at the reorder window. Maintaining the ordering of the frames may include, but is not limited to, the insertion of a placeholder frame in the reorder window, such as placeholder frame containing null data.

Figure 2:
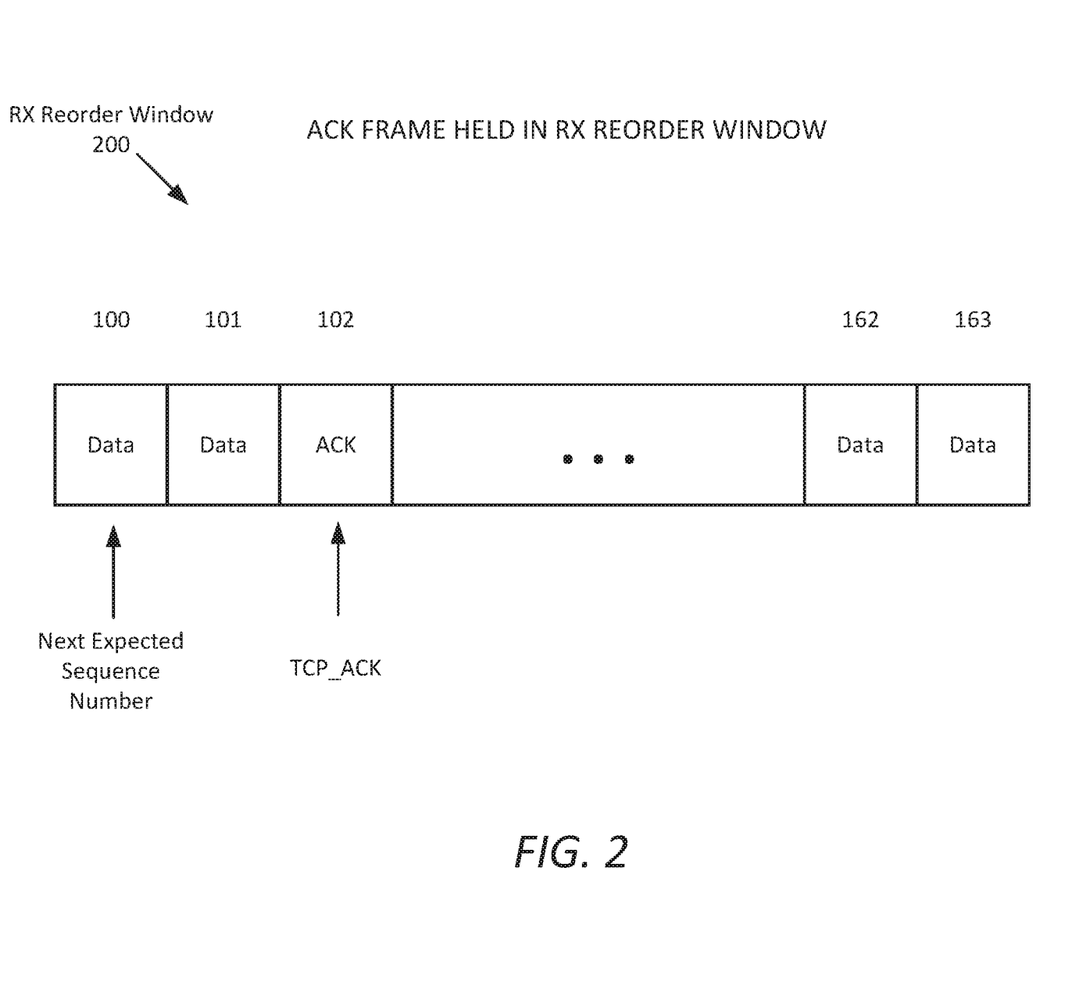
FIG. 2 is an illustration of an acknowledgement frame held in an Rx reorder window of a network device.

FIG. 2 is an illustration of an acknowledgement frame held in an Rx reorder window of a network device. An Rx reorder window 200, such as the reorder window supported by the network device 110 illustrated in FIG. 1, includes multiple frames that are buffered and reordered for processing, as shown in slots 100 through 163 in FIG. 2. Each frame includes a sequence number (SN), with the reorder window including a next expected sequence number.

In a particular operation, the frames held in the reorder window 200 may include an ACK frame (TCP_ACK). The TCP_ACK may include a block ACK that provides acknowledgement for multiple aggregated frames. However, one or more previous ACK or data frames may be dropped or delayed, and the TCP_ACK may remain in the buffer until a reorder time out period has expired, thus unnecessarily delaying the processing of the ACK frame.

In this case, TCP ACK (in slot 102) may be pending in the Rx reorder window 200 due to a previous frame failure. The ACK frame can be delivered to and upper protocol stack only when reordering timeout fired. For this reason, the TCP reorder window cannot be updated in time for efficient processing of the ACK frame, and thus will adversely affect system performance.

Figure 3:
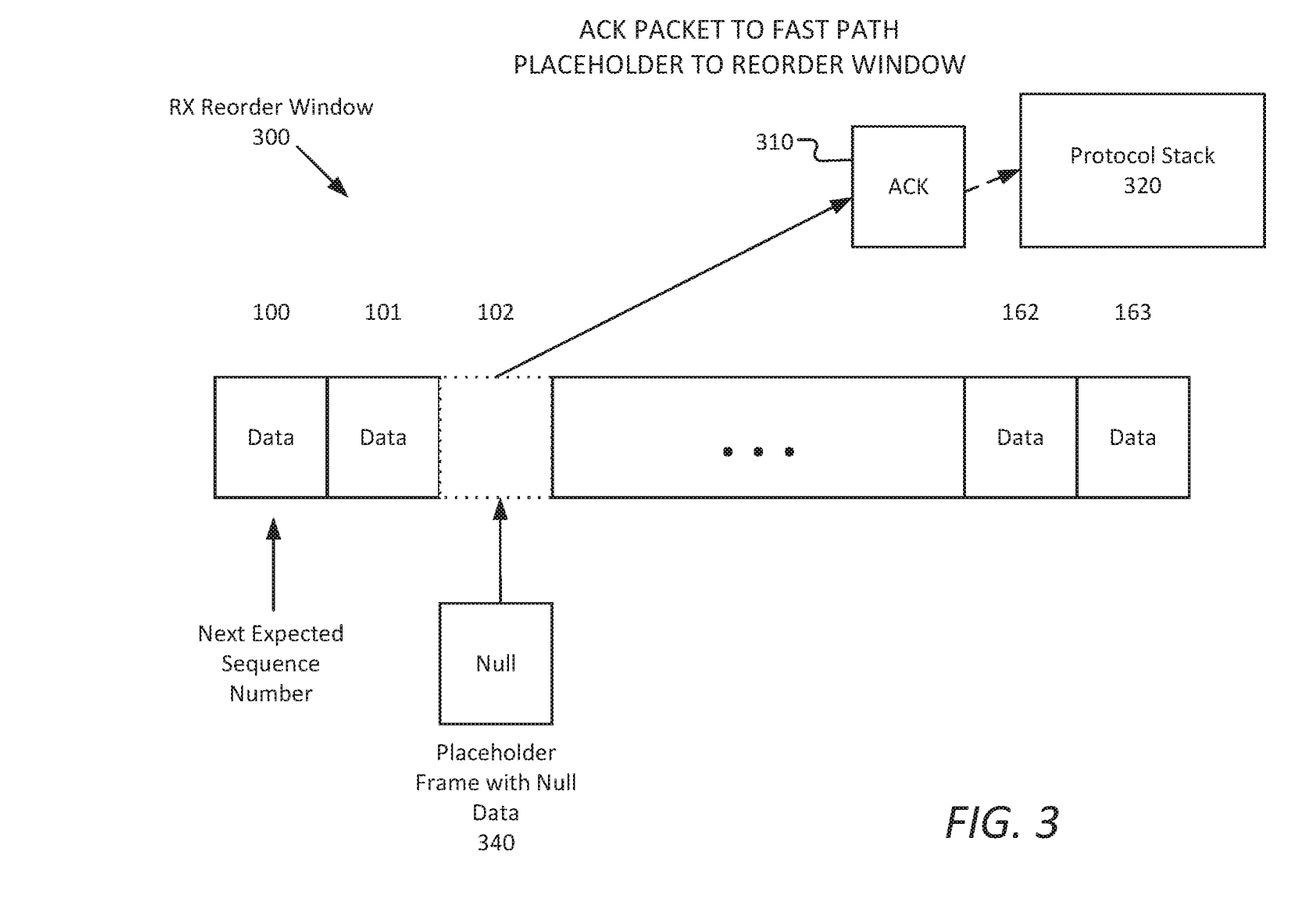
FIG. 3 is an illustration of operation of a fast track for processing of an acknowledgement frame at a network device according to some embodiments.

FIG. 3 is an illustration of operation of a fast track for processing of an acknowledgement frame at a network device according to some embodiments. As illustrated in FIG. 3, an Rx reorder window 300 again includes multiple frames that are buffered and reordered for processing, as shown in slots 100 through 163 in FIG. 3. Each frame includes an SN, with the reorder window including a next expected sequence number. In a particular operation, the frames received by a network device may include an ACK frame (TCP_ACK), such as a block ACK that provides acknowledgement for multiple aggregated frames.

In some embodiments, rather than placing the ACK frame in the Rx reorder window 300 for buffering and reordering, as is illustrated in FIG. 2, the ACK frame is instead transferred for processing, such as transfer to the illustrated protocol stack 320.

In some embodiments, the operation further provides for maintaining ordering of frames in the Rx reorder window, such as, for example, the substitution of a placeholder frame containing null data 340.

In some embodiments, the operation further provides for maintaining the processing of ACK frames in increasing order by dropping a succeeding ACK frame if the succeeding ACK frame includes an earlier sequence number than a sequence number of ACK frame 310.

Figure 4:
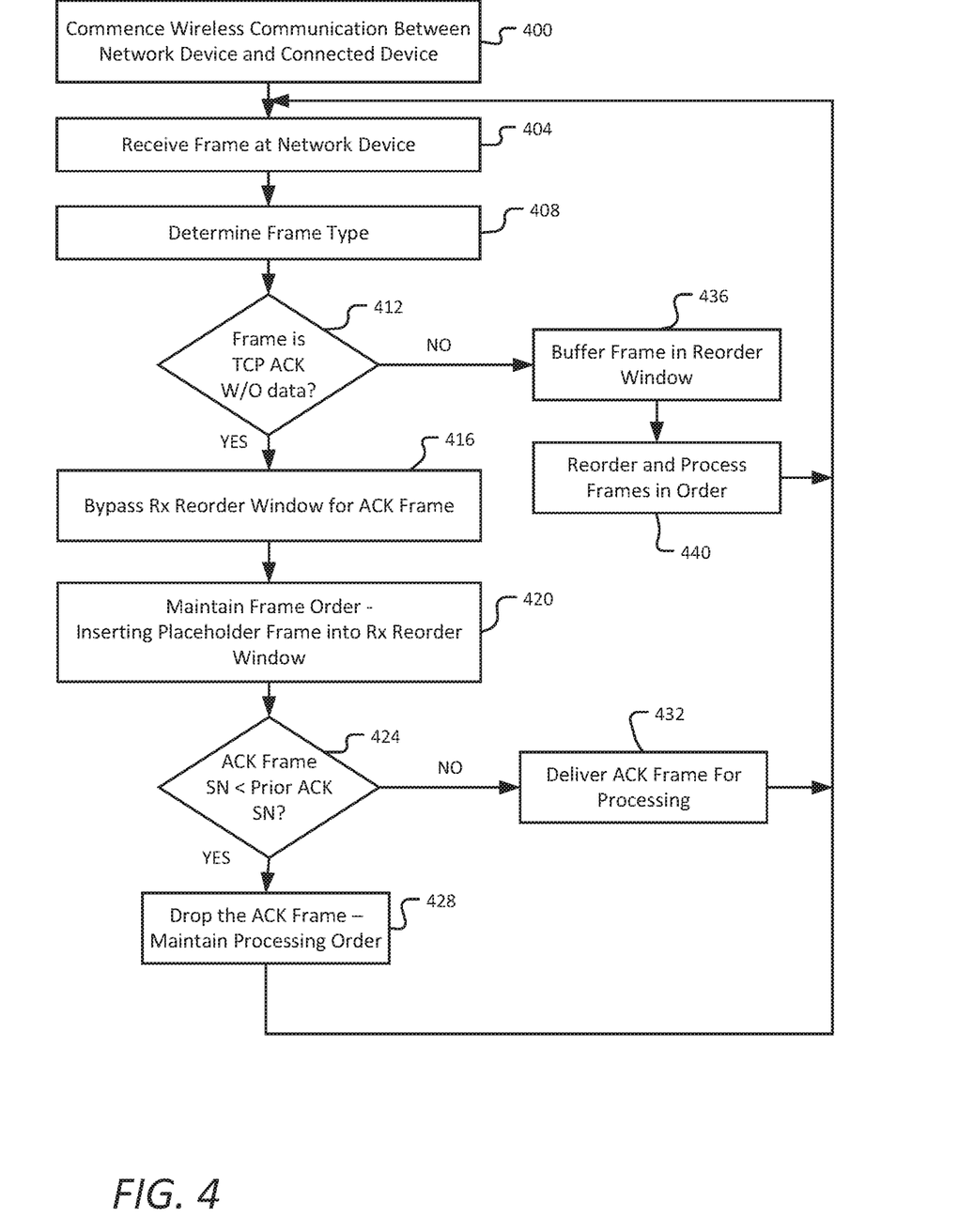
FIG. 4 is a flow chart to illustrate a process for fast track processing of acknowledgement frames according to some embodiments.

FIG. 4 is a flow chart to illustrate a process for fast track processing of acknowledgement frames according to some embodiments. Upon commencing wireless communication between a network device and a connected device 400, wherein the network device may, for example, include or be coupled with an access point, frames are received at the network device from the connected device via wireless communication channel. In some embodiments, upon receiving a frame at the network device 404, there is a determination regarding the frame type 408, which may include examining a preamble or other portion of the frame to identify the type of frame.

In some embodiments, upon determining that the frame that is an ACK frame that does not carry data 412, the process includes bypassing an Rx reorder frame (such as reorder window 300 illustrated in FIG. 3) for the ACK frame 416. In some embodiments, the process further includes maintaining an ordering of frames in the Rx reorder window 420, which may include inserting a placeholder frame, such as a frame containing null data, as a substitute for the ACK frame.

In some embodiments, the process further includes determining whether a sequence number for the ACK frame is less than a prior processed ACK frame 424. If so, the ACK frame is dropped to maintain ordering of ACK frames for processing 428. If not, then the ACK frame may be delivered for processing 432.

Upon determining that the received frame is not an ACK frame that does not carry data 412, such as in determining that the frame is a data frame, the frame is to be buffered in the reorder window 436 and reordered processed in order 440 pursuant to normal buffering and reordering operation. The process then may return to receiving additional frames at the network device 404 or other related processing.

Figure 5:
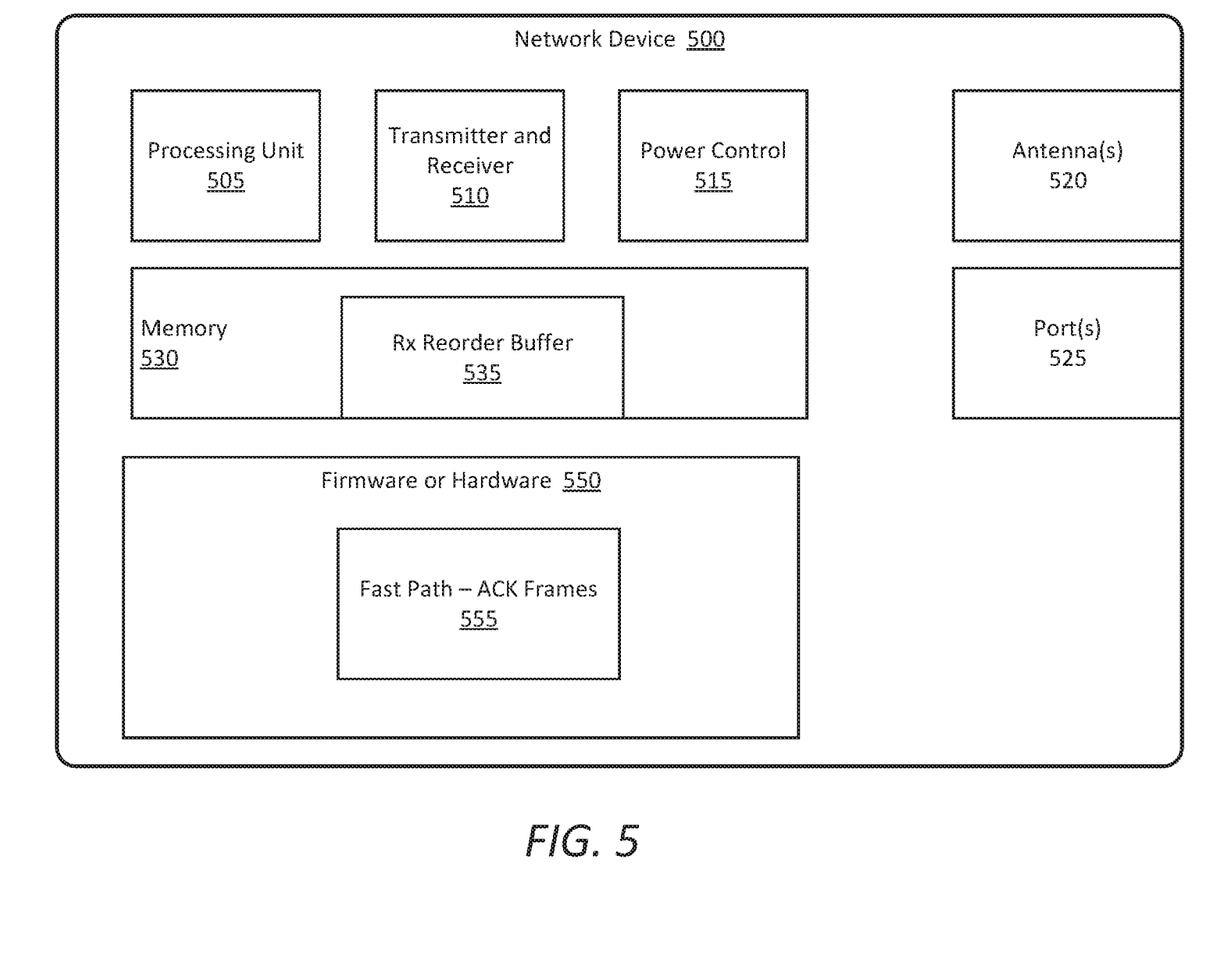
FIG. 5 is block diagram to illustrate an access point according to some embodiments.

FIG. 5 is block diagram to illustrate a network device to provide fast track processing of acknowledgement frames according to some embodiments. A network device includes additional components and elements not illustrated in FIG. 5, which is simplified for sake of illustration. The illustrated network device 500 may include or be coupled with an access point operating under one or more IEEE 802.11 standards. In some embodiments, the network device 500 provides for fast track processing of acknowledgement frames, such as illustrated in FIG. 4.

In some embodiments, the network device 500 includes a processing unit 505, a transmitter and receiver 510, power control 515, one or more antennas 520 for wireless signal communication, and one or more ports 525 for network connections or other connections. The network device 500 may further include memory 530 for storage of data, which may include volatile and nonvolatile memory (including flash memory and similar elements), registers, and other storage technologies. In some embodiments, memory 530 may an Rx reorder buffer 535 for buffering and reordering of frames received at the network device 500.

In some embodiments, the network device 500 further includes firmware or hardware or both 550 that includes fast path handling of received ACK frames 555. In some embodiments, fast path handling of received ACK frames 555 includes bypassing the Rx reorder buffer 535 for received TCP ACK frames, the ACK frames to instead be transferred for processing, such as transfer to an upper protocol stack. In some embodiments, fast path handling of received ACK frames further provides for maintaining ordering of frames in the Rx reorder buffer 535, such as, for example, the substitution of a placeholder frame containing null data.

In some embodiments, fast path handling of received ACK frames further includes dropping an ACK frame if the ACK frame has an earlier sequence number than a sequence number of a prior processed ACK frame in order to maintain the processing of ACK frames in succeeding order.

Figure 6:
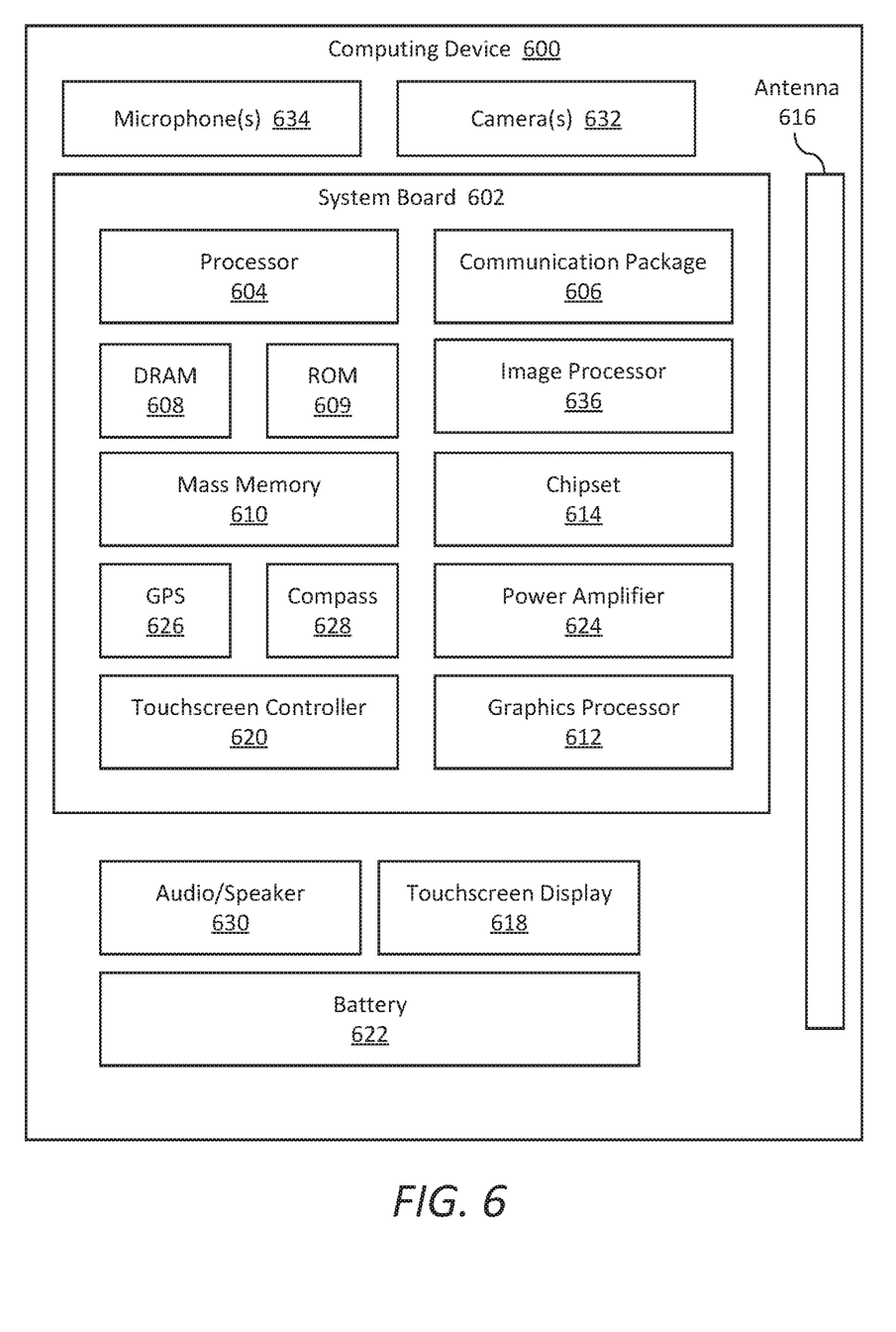
FIG. 6 illustrates a computing device according to some embodiments.

FIG. 6 illustrates a computing device according to some embodiments. In some embodiments, the computing device may include a device to communicate with an access point or other network device in a network. Computing device 600 houses a system board 602 (which may also be referred to as a motherboard, main circuit board, or other terms). The board 602 may include a number of components, including but not limited to a processor 604 and at least one communication package or chip 606. The communication package

606 is coupled to one or more antennas 616. The processor 604 is physically and electrically coupled to the board 602.

Depending on its applications, computing device 600 may include other components that may or may not be physically and electrically coupled to the board 602. These other components include, but are not limited to, volatile memory (e.g., DRAM) 608, nonvolatile memory (e.g., ROM) 609, flash memory (not shown), a graphics processor 612, a digital signal processor (not shown), a crypto processor (not shown), a chipset 614, an antenna 616, a display 618 such as a touchscreen display, a touchscreen controller 620, a battery 622, an audio codec (not shown), a video codec (not shown), a power amplifier 624, a global positioning system (GPS) device 626, a compass 628, an accelerometer (not shown), a gyroscope (not shown), a speaker or other audio element 630, one or more cameras 632, a microphone array 634, and a mass storage device (such as hard disk drive) 610, compact disk (CD) (not shown), digital versatile disk (DVD) (not shown), and so forth). These components may be connected to the system board 602, mounted to the system board, or combined with any of the other components.

The communication package 606 enables wireless and/or wired communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 606 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 600 may include a plurality of communication packages 606. For instance, a first communication package 606 may be dedicated to shorter range wireless communications such as Wi-Fi and Bluetooth and a second communication package 606 may be dedicated to longer range wireless communications such as GSM, EDGE, GPRS, CDMA, WiMAX, LTE, Ev-DO, and others.

In various implementations, the computing device 600 may be a laptop, a netbook, a notebook, an Ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 600 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, a storage medium includes instructions for operations including receiving frames at a network device via a wireless communication channel, each frame including a sequence number; holding the received frames in a reorder buffer to be reordered according to the sequence numbers of the received frames, wherein a frame is to be removed from the reorder buffer for delivery to a next process upon the sequence number of the frame equaling an expected next sequence number or upon expiration of a reordering timeout period for the frame; and, upon receiving an acknowledgment (ACK) frame, the ACK frame containing no data and having a sequence number that is later than any ACK frame that has been previously processed at the network device bypassing the reorder buffer for the ACK frame, and delivering the ACK frame to the next process, and maintaining an order position for the ACK frame in the reorder buffer until the reordering timeout period expires for the ACK frame In some embodiments, a network device includes a processor; a transmitter and receiver for wireless communication; a memory including a reorder buffer for buffering and reordering received frames; and firmware including a fast path for acknowledgement frames, wherein the network device is to receive frames via a wireless communication channel, each frame including a sequence number; hold the received frames in the reorder buffer to be reordered according to the sequence numbers of the received frames, wherein a frame is to be removed from the reorder buffer for delivery to a next process upon the sequence number of the frame equaling an expected next sequence number or upon expiration of a reordering timeout period for the frame; and upon receiving an ACK frame, the ACK frame containing no data and having a sequence number that is later than any ACK frame that has been previously processed at the network device bypass the reorder buffer for the ACK frame, and deliver the ACK frame to the next process, and maintain an order position for the ACK frame in the reorder buffer until the reordering timeout period expires for the ACK frame.

In some embodiments, a method for fast path handling of acknowledgement frames including receiving frames at a network device via a wireless communication channel, each frame including a sequence number; holding the received frames in a reorder buffer to be reordered according to the sequence numbers of the received frames, wherein a frame is to be removed from the reorder buffer for delivery to a next process upon the sequence number of the frame equaling an expected next sequence number or upon expiration of a reordering timeout period for the frame; and, upon receiving an ACK frame, the ACK frame containing no data and having a sequence number that is later than any ACK frame that has been previously processed at the network device bypassing the reorder buffer for the ACK frame, and delivering the ACK frame to the next process, and maintaining an order position for the ACK frame in the reorder buffer until the reordering timeout period expires for the ACK frame.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:

receiving frames at a network device via a wireless communication channel, each frame including a sequence number;

holding the received frames in a reorder buffer to be reordered according to the sequence numbers of the received frames, wherein a frame is to be removed from the reorder buffer for delivery to a next process upon the sequence number of the frame equaling an expected next sequence number or upon expiration of a reordering timeout period for the frame; and upon receiving an acknowledgment (ACK) frame, the ACK frame containing no data and having a sequence number that is later than any ACK frame that has been previously processed at the network device:

bypassing the reorder buffer for the ACK frame, and delivering the ACK frame to the next process, and maintaining, until the reordering timeout period expires for the ACK frame, an order position for the ACK frame in the reorder by inserting a placeholder frame in the reorder buffer to substitute for the ACK frame;

upon receiving an ACK frame with a sequence number that is prior to an ACK frame that have been previously processed at the network device, dropping the ACK frame, wherein the network device is one of a wireless access point, a laptop or other computing device, a cell phone, or an IoT (Internet of Things) device.

2. The one or more mediums of claim 1, wherein the ACK frame is a TCP (Transmission Control Protocol) ACK frame.

3. The one or more mediums of claim 2, wherein the ACK frame is a block ACK frame to acknowledge multiple frames.

4. A network device comprising:

a processor;

a transmitter and receiver for wireless communication;

a memory including a reorder buffer for buffering and reordering received frames; and firmware including a fast path for acknowledgement (ACK) frames, wherein the network device is to:

receive frames at a network device via a wireless communication channel, each frame including a sequence number;

hold the received frames in the reorder buffer to be reordered according to the sequence numbers of the received frames, wherein a frame is to be removed from the reorder buffer for delivery to a next process upon the sequence number of the frame equaling an expected next sequence number or upon expiration of a reordering timeout period for the frame; and upon receiving an ACK frame, the ACK frame containing no data and having a sequence number that is later than any ACK frame that has been previously processed at the network device:

bypass the reorder buffer for the ACK frame, and deliver the ACK frame to the next process, and maintain, until the reordering timeout period expires for the ACK frame, an order position for the ACK frame in the reorder buffer by inserting a placeholder frame in the reorder buffer to substitute for the ACK frame;

upon receiving an ACK frame with a sequence number that is prior to an ACK frame that have been previously processed at the network device, drop the ACK frame, wherein the network device is one of a wireless access point, a laptop or other computing device, a cell phone, or an IoT (Internet of Things) device.

5. The network device of claim 4, wherein the ACK frame is a TCP (Transmission Control Protocol) ACK frame.

6. The network device of claim 5, wherein the ACK frame is a block ACK frame to acknowledge multiple frames.

7. The network device of claim 4, wherein the network device operates under one or more IEEE (Institute of Electrical and Electronic Engineers) 802.11 standards.

8. A method for fast path handling of acknowledgement frames comprising:

receiving frames at a network device via a wireless communication channel, each frame including a sequence number;

holding the received frames in a reorder buffer to be reordered according to the sequence numbers of the received frames, wherein a frame is to be removed from the reorder buffer for delivery to a next process upon the sequence number of the frame equaling an expected next sequence number or upon expiration of a reordering timeout period for the frame; and upon receiving an acknowledgment (ACK) frame, the ACK frame containing no data and having a sequence number that is later than any ACK frame that has been previously processed at the network device:

bypassing the reorder buffer for the ACK frame, and delivering the ACK frame to the next process, and maintaining, until the reordering timeout period expires for the ACK frame, an order position for the ACK frame in the reorder by inserting a placeholder frame in the reorder buffer to substitute for the ACK frame;

upon receiving an ACK frame with a sequence number that is prior to an ACK frame that have been previously processed at the network device, dropping the ACK frame, wherein the network device is one of a wireless access point, a laptop or other computing device, a cell phone, or an IoT (Internet of Things) device.

9. The method of claim 8, wherein the ACK frame is a TCP (Transmission Control Protocol) ACK frame.

10. The method of claim 9, wherein the ACK frame is a block ACK frame to acknowledge multiple frames.

* * * * *